No. 740,700. PATENTED OCT. 6, 1903.
G. A. SCHÜTZ.
PROCESS OF UTILIZING THE PRODUCTS OF COMBUSTION OF STEAM BOILER FURNACES.
APPLICATION FILED AUG. 4, 1902.

NO MODEL. 2 SHEETS—SHEET 2.

Witnesses:

Inventor:
Gustav A. Schütz
By Knight Bros
Attorneys

No. 740,700.

Patented October 6, 1903.

UNITED STATES PATENT OFFICE.

GUSTAV ADOLF SCHÜTZ, OF WURZEN, GERMANY.

PROCESS OF UTILIZING THE PRODUCTS OF COMBUSTION OF STEAM-BOILER FURNACES.

SPECIFICATION forming part of Letters Patent No. 740,700, dated October 6, 1903.

Application filed August 4, 1902. Serial No. 118,277. (No specimens.)

*To all whom it may concern:*

Be it known that I, GUSTAV ADOLF SCHÜTZ, a subject of the King of Saxony, residing at Wurzen, in the Kingdom of Saxony, Empire of Germany, have invented a new and useful Process of Utilizing the Products of Combustion of Steam-Boiler Furnaces, of which the following is a specification.

My invention relates to the utilization of the products of combustion of steam-boiler furnaces in connection with the steam in generation of power and for other useful purposes, including the recovery of the carbon dioxid present in said products in a convenient form for commercial use and sale.

Previous attempts have been made to utilize carbon dioxid occurring in the products of combustion of a steam-boiler furnace in connection with steam for power purposes before the gas is recovered for commercial use; but such attempts have been unsuccessful, for the reason that the lubricant of the engine or motor to be driven by carbon dioxid has contaminated the carbon dioxid and rendered it unfit for commercial use, so that a step of purification of the gas was necessary, involving the use of separate and specially-provided apparatus for this purpose in order to obtain gas of sufficient purity to be fit for use and sale. It has been shown by practical experiments that ordinary potash water or other alkaline lye may be employed for lubricating engines and motors, and I have availed myself of this feature in carrying out my invention.

In accompanying drawings is illustrated an apparatus for carrying out the invention.

Figure 1:
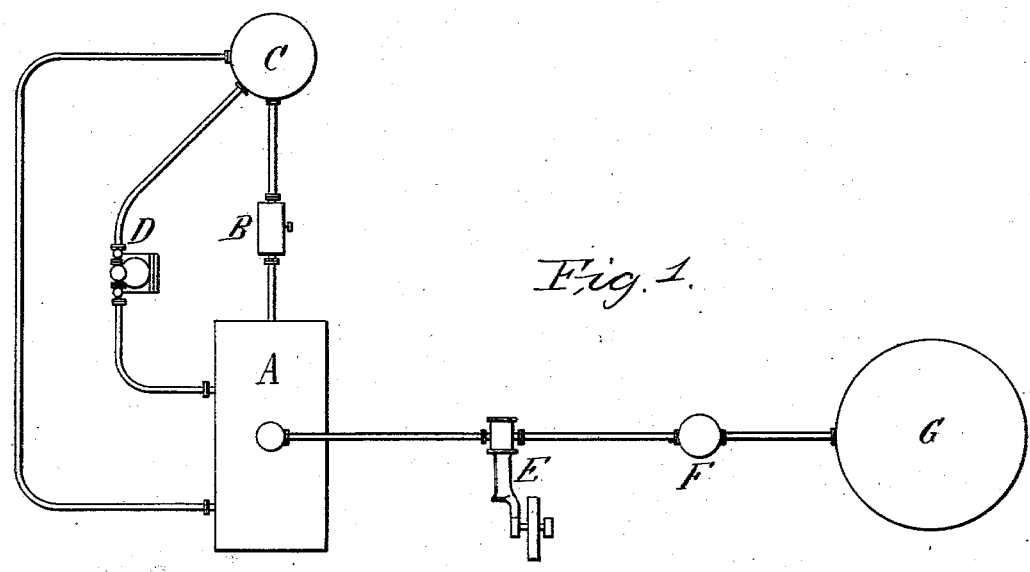
Figure 2:
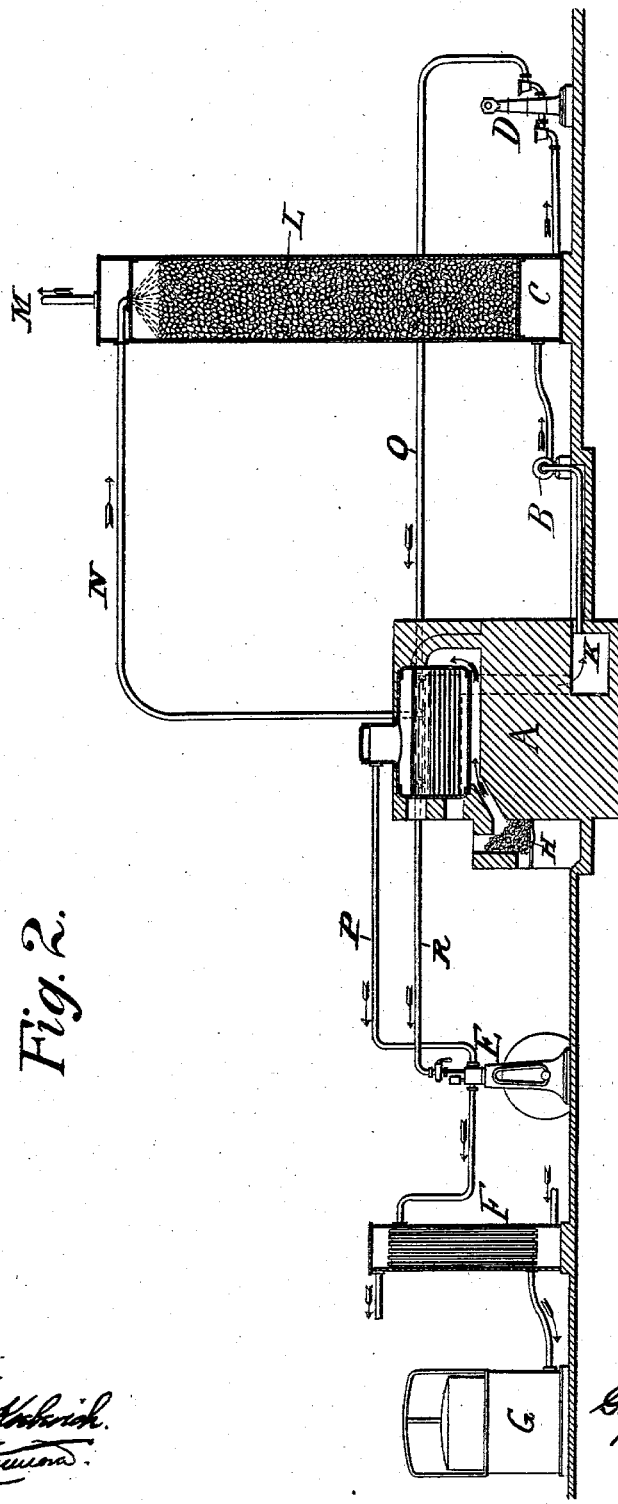

Figure 1 is a diagrammatic plan view of suitable apparatus for the purpose. Fig. 2 is sectional view.

In said drawings, A represents a boiler of ordinary construction provided with the usual furnace H and the smoke box or flues K for the products of combustion of the fuel in the furnace H. Connected with the smoke-box K is a pump B for withdrawing the products of combustion from the flues and smoke-box and forcing the same through an absorption-tower C. Said tower is filled with granular material L, over which is allowed to trickle an alkaline lye capable of absorbing carbon dioxid from the products of combustion. At the top of the tower is provided an outlet M for the unabsorbed gases. The lye for absorbing the gases is led to the top of the tower through a suitable pipe N, which leads from the boiler A. The lye trickling over the granular material in the tower L has a large surface exposed to the gases rising through said tower and absorbs the carbon dioxid in said gases, and thereby becomes carbonated. The carbonated lye collects in the bottom portion of the tower C, from which it is withdrawn by means of a pump D and forced through a pipe O into the boiler A. In the boiler A the carbonated lye is subjected to the heat of the furnace, and the lye is converted into steam and carbon dioxid, which are generated at suitable pressure and conducted from the steam-boiler through the pipe P to the engine or motor E. Having performed its work in the motor or engine E, the steam and carbon dioxid are conducted to the condenser F, wherein the steam is condensed, and thereby separated from the carbon dioxid. The latter is led into a gasometer G, where it is collected and from which it may be taken and compressed or liquefied and utilized for any of the numerous purposes to which the said gas is applied in the arts. In the steam-boiler the carbonated lye is reconverted into the lye and carbon dioxid. From the boiler the lye is led by a suitable pipe R to the engine E for lubricating. From the above it will be seen that I have devised an economical method and system for utilizing the waste products of combustion and obtaining a valuable product therefrom.

What I claim as new, and desire to secure by Letters Patent, is—

The process of utilizing and recovering carbon dioxid from products of combustion, which consists in treating said products with an alkaline lye to carbonate the same, evaporating said carbonated lye, conducting the steam and carbon dioxid so produced to a power-generator, separating the carbon dioxid and steam in the exhaust-gases from said generator and recovering the carbon dioxid.

In testimony whereof I have hereunto set my hand in the presence of two witnesses.

GUSTAV ADOLF SCHÜTZ.

Witnesses:
RUDOLPH FRICKE,
GEO. WARNER.